May 19, 1942.　　　　G. BROUWER　　　　2,283,165
DEVICE FOR MILLING OIL SLOTS IN PISTON RINGS
Filed March 5, 1940

Inventor
George Brouwer
by James R. McKnight
his Attorney

Patented May 19, 1942

2,283,165

UNITED STATES PATENT OFFICE 2,283,165

DEVICE FOR MILLING OIL SLOTS IN PISTON RINGS

George Brouwer, Muskegon, Mich., assignor, by mesne assignments, to Ramsey Manufacturing Company, a corporation of Michigan Application March 5, 1940, Serial No. 322,377

2 Claims. (Cl. 90—21)

This invention relates to a device for milling oil slots in a plurality of piston rings in one continuous operation.

Among the objects of this invention is to provide a device for definitely positioning and for accurately cutting oil slots in a plurality of piston rings in one continuous series of operations, such device resulting in the speeding up of production, more perfect merchandise and resultant economies, and such other objects, advantages and capabilities as will later more fully appear and which are inherently possessed by my invention.

While I have shown in the accompanying drawing a preferred form of my invention, yet I desire it understood that the same is susceptible of modification and change without departing from the spirit of my invention.

Figure 1:
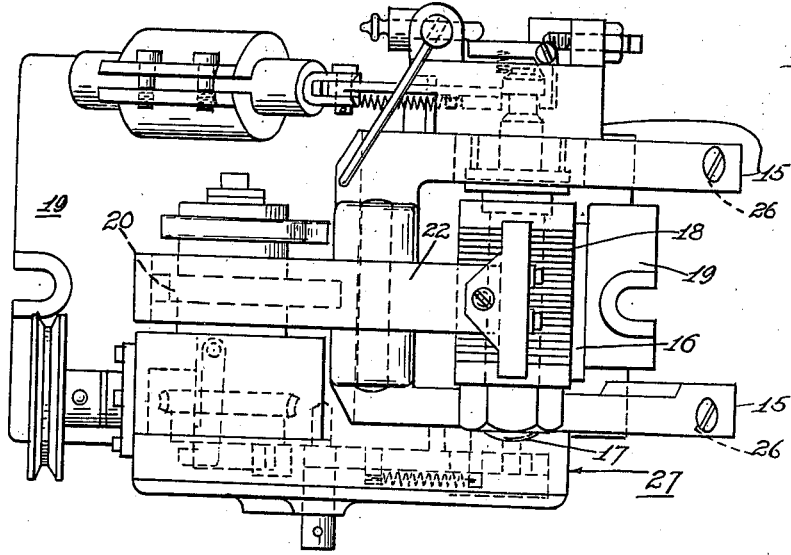
Figure 2:
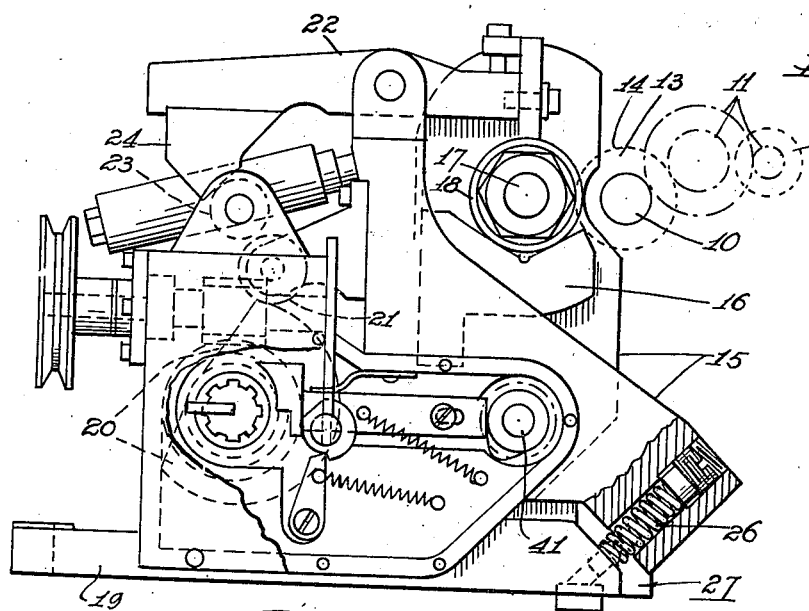
Figure 3:
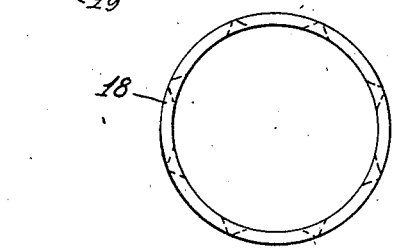

Referring to the drawing, Fig. 1 is a top plan view of my device; Fig. 2 is a side elevational view of the same partly broken away and in section to better show the operation and Fig. 3 is a detailed view of the piston ring.

In the embodiment selected to illustrate my invention the cutter holding arbor 10 is rotated in a milling machine upon a feed table on which is fastened my complete piston ring device 27. The holding arbor 10 is rotated by means of gears 11 by operation of a motor 12. On this arbor 10 is fixed cutting members 13 having a plurality of spaced cutting edges 14. Positioned opposite to said cutting members 13 is a rocker or cradle 15 having a V-shaped receiving portion 16 for an arbor 17 holding a plurality of piston rings 18. The rocker 15 is pivotally mounted on base 19 by means of shaft 41 and is pivoted by operation of a cam 20 which engages a roller 21 attached to said rocker 15.

As the rocker 15 is pivoted downwardly the rings 18 on the arbor 17 contact the cutting members 13 for the cutting of oil slots therein. During the cutting operation the arbor 17 is held to the V shaped portion 16 by means of a clamping arm or lever 22 which contacts the top portion of the arbor 17 on one end and extends rearwardly over a fixed roller 23 which imparts a clamping movement to the clamping lever 22. At the rear end of the member 22 there is a cam block 24 which engages the fixed roller 23, causing the clamping arm 22 to tilt upwardly forcing the other end of the clamping arm down on the arbor located in the V block—teeter totter fashion. As it does that arbor 10 rotates and with it rotates cutting members 13 so that said rotation of the cutters 13 completes one slot in the rings 18. The cutting members 13 are attached to arbor 10. The rings 18 in the V shaped receiving portion 16 are rocked to and from the cutting edges 14. The cam 20 then permits springs 26 to force the cradle 15 out of contact with the cutting members 13. The operation is repeated the required number of times for the number of slots desired in the piston rings 18.

Having thus described my invention, I claim:

1. A device for milling oil slots in a plurality of piston rings comprising rotatable cutting members, a base, a rocker pivotally mounted on said base and positioned opposite said cutting members, said rocker having a V shaped receiving portion adapted to receive an arbor having a plurality of piston rings, and means for pivoting said rocker forwardly so that said rings on the arbor in the V shaped portion will contact said cutting members for cutting oil slots therein, and means for pivoting said rocker rearwardly for withdrawing said rings from contact with said cutting members.

2. A device for milling oil slots in a plurality of piston rings comprising rotatable cutting members, a base, a rocker pivotally mounted on said base and positioned opposite said cutting members, said rocker having a V shaped receiving portion adapted to receive an arbor having a plurality of piston rings, a cam adapted to pivot the rocker forwardly so that said rings will contact said cutting members for cutting oil slots therein, a clamping member pivotally mounted on said rocker and adapted to hold said arbor having said rings to said V shaped portion during the cutting operation and springs attached to said rocker, said rocker adapted upon movement of the cam to permit the springs to move the rocker rearwardly so that the rings in the receiving arbor will be withdrawn from contact with the cutting members.

GEORGE BROUWER.